No. 819,089. PATENTED MAY 1, 1906.
C. W. SHOEMAKER & J. M. LITHGOW.
GAS TURBINE.
APPLICATION FILED APR. 14, 1904.

6 SHEETS—SHEET 1.

WITNESSES:
Herbert Bradley
Fred Kirchner

INVENTORS
Charles W. Shoemaker and John M. Lithgow
by Christy and Christy
ATT'YS.

No. 819,089. PATENTED MAY 1, 1906.
C. W. SHOEMAKER & J. M. LITHGOW.
GAS TURBINE.
APPLICATION FILED APR. 14, 1904.

6 SHEETS—SHEET 4.

WITNESSES: INVENTORS
Herbert Bradley. Charles W. Shoemaker and John M. Lithgow
Fred Kirchner. by Christy and Christy
Atty's.

No. 819,089. PATENTED MAY 1, 1906.
C. W. SHOEMAKER & J. M. LITHGOW.
GAS TURBINE.
APPLICATION FILED APR. 14, 1904.
6 SHEETS—SHEET 5.
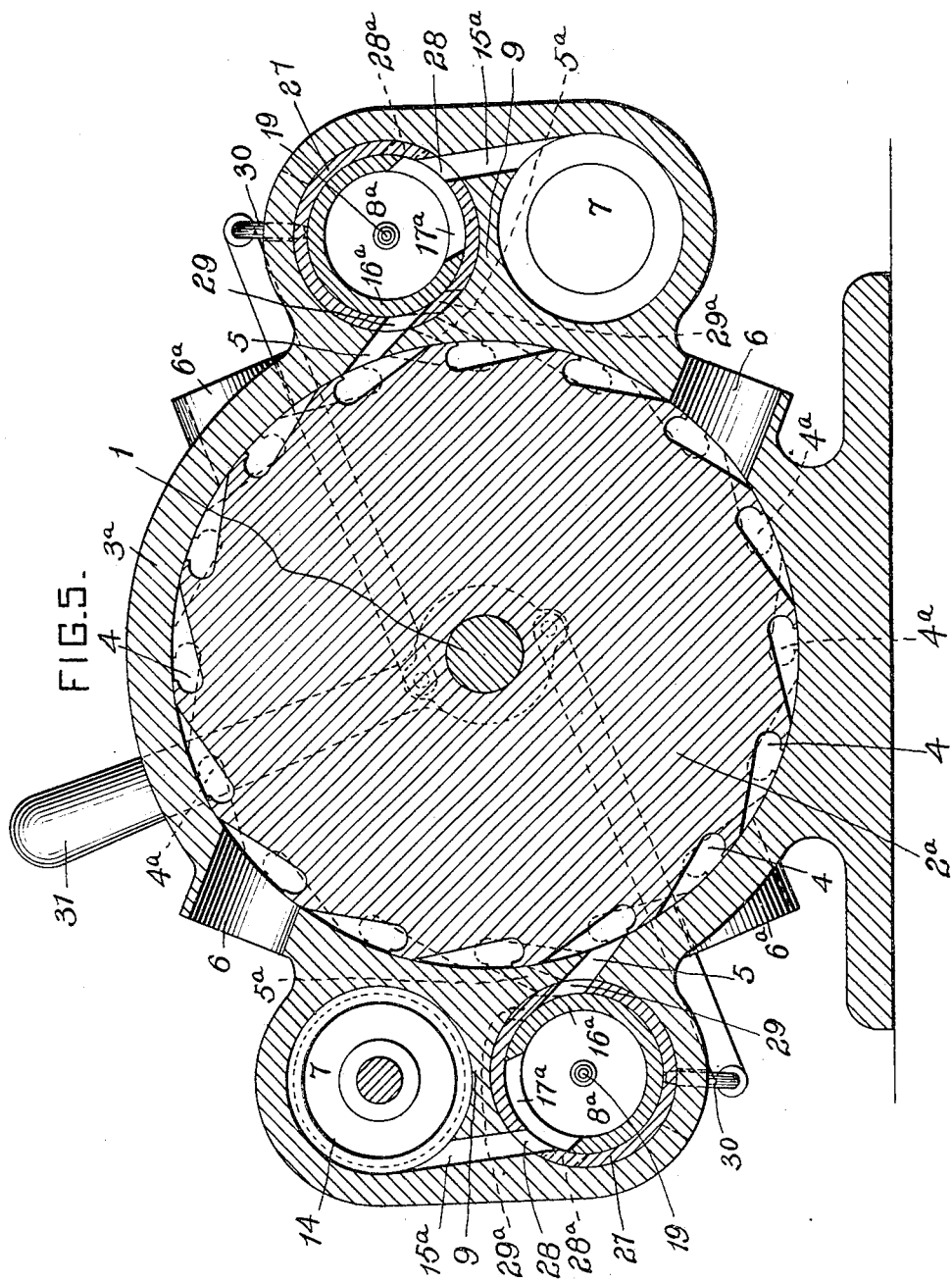

No. 819,089. PATENTED MAY 1, 1906.
C. W. SHOEMAKER & J. M. LITHGOW.
GAS TURBINE.
APPLICATION FILED APR. 14, 1904.
6 SHEETS—SHEET 6.
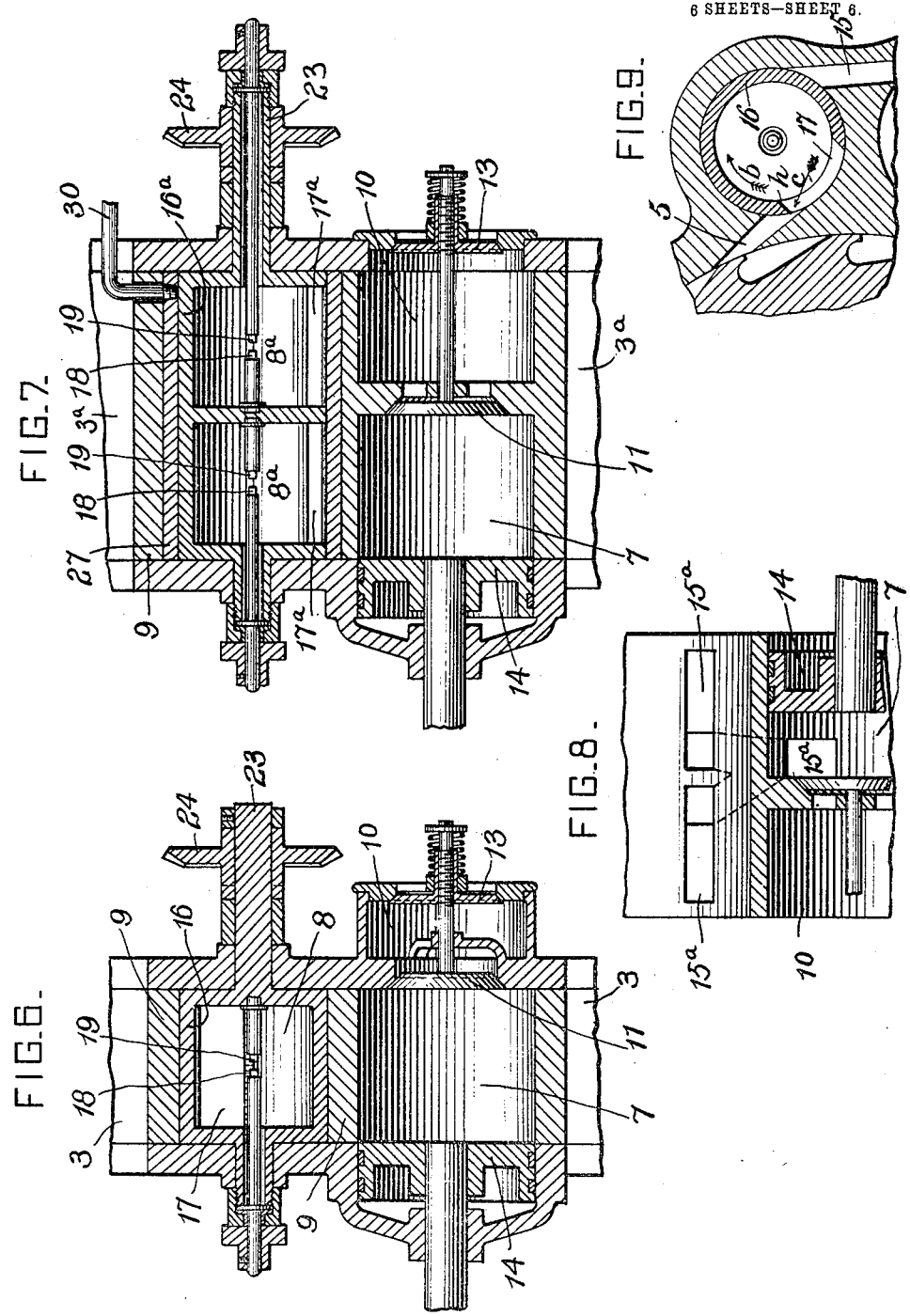
WITNESSES:
Herbert Bradley.
Fred Kirchner.
INVENTORS
Charles W. Shoemaker and John M. Lithgow
by Christy and Christy
Atty's.

UNITED STATES PATENT OFFICE.

CHARLES W. SHOEMAKER AND JOHN M. LITHGOW, OF ALLEGHENY, PENNSYLVANIA.

GAS-TURBINE.

No. 819,089.     Specification of Letters Patent.     Patented May 1, 1906.

Application filed April 14, 1904. Serial No. 203,186.

*To all whom it may concern:*

Be it known that we, CHARLES W. SHOEMAKER and JOHN M. LITHGOW, citizens of the United States, residing at Allegheny, in the county of Allegheny and State of Pennsylvania, have invented or discovered certain new and useful Improvements in Gas-Turbines, of which improvements the following is a specification.

Our invention concerns the construction of turbine-engines adapted to be impelled by the explosive force of certain substances—for example, gasolene or naphtha; and the object of our improvements is a structure of the character indicated which shall be of practical and economic value.

Figure 1:
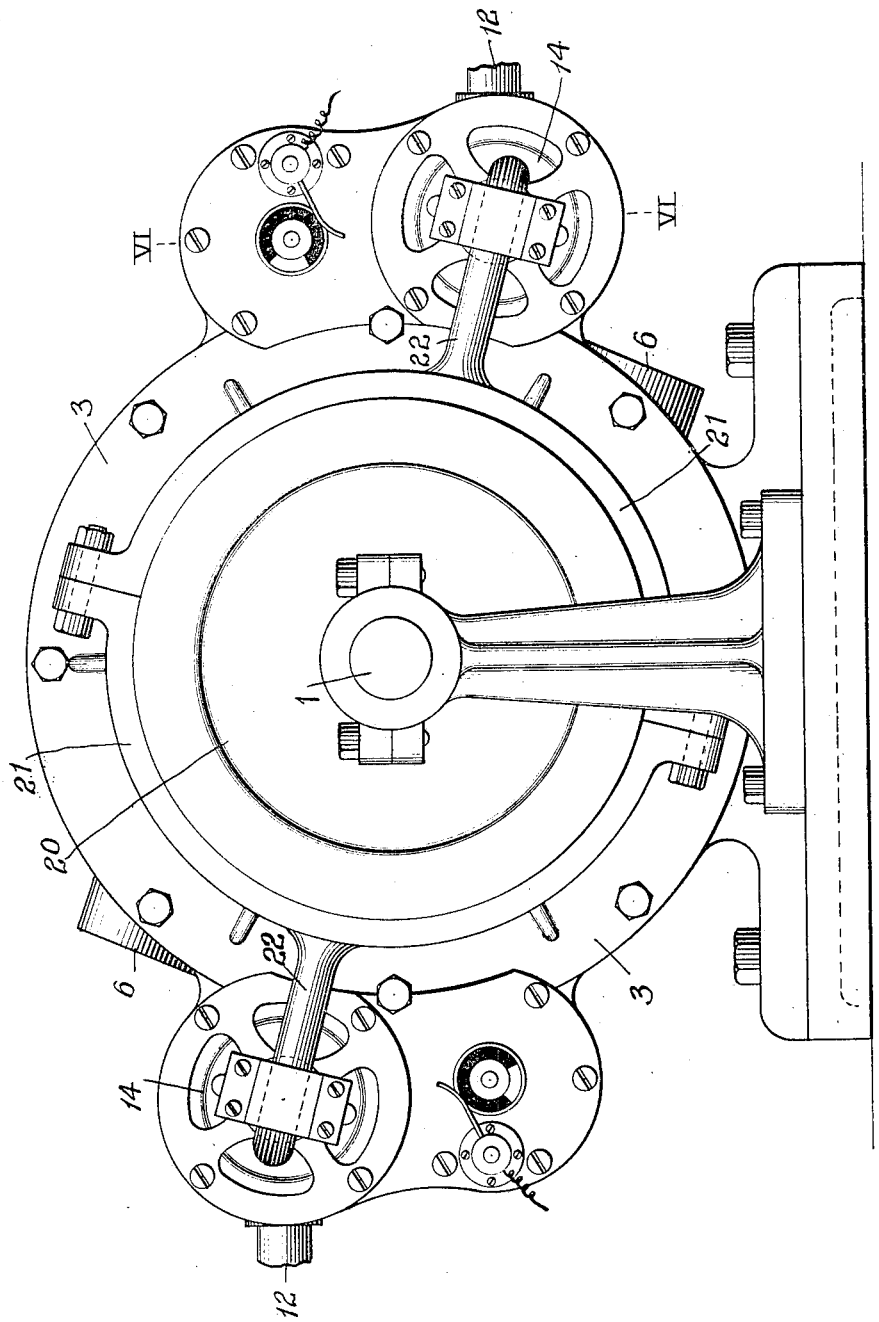
Figure 2:
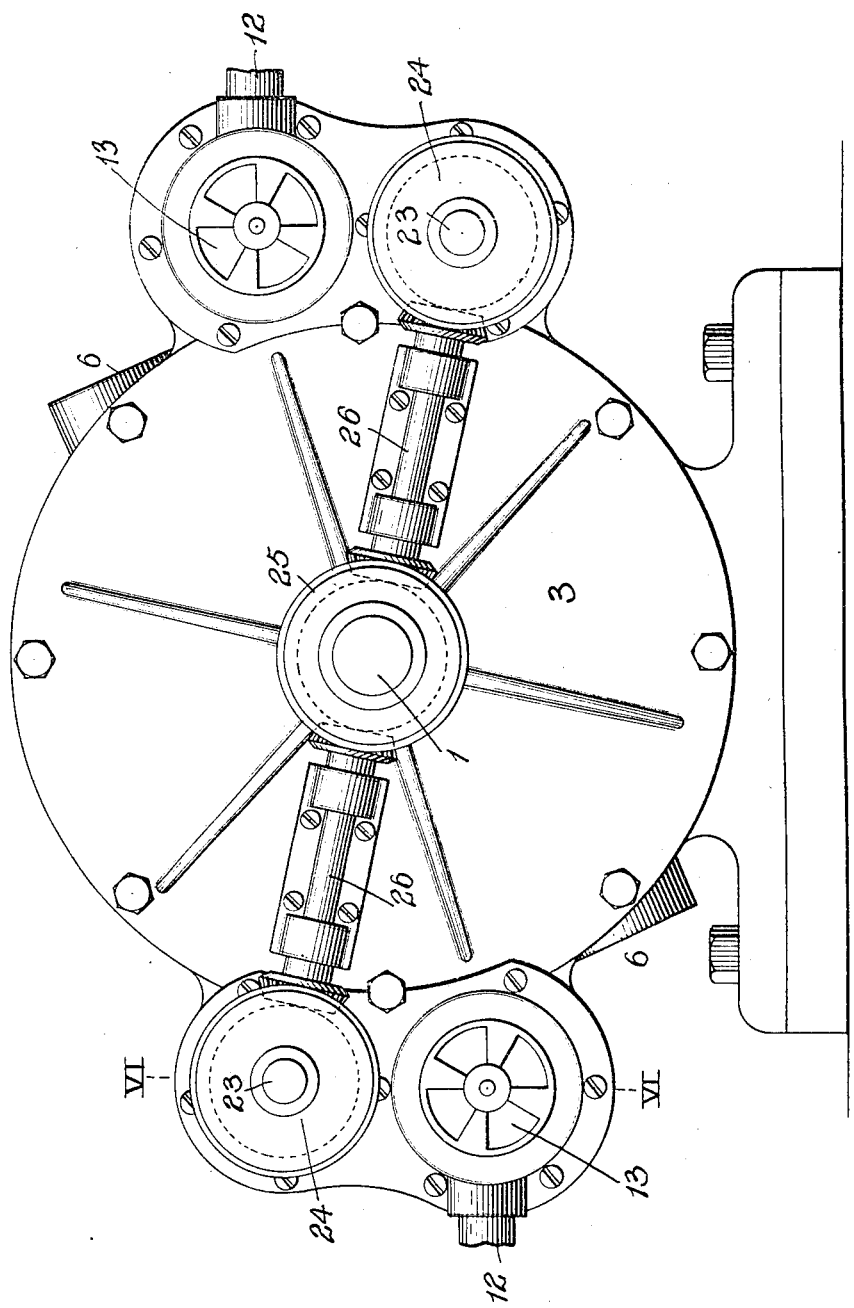
Figure 3:
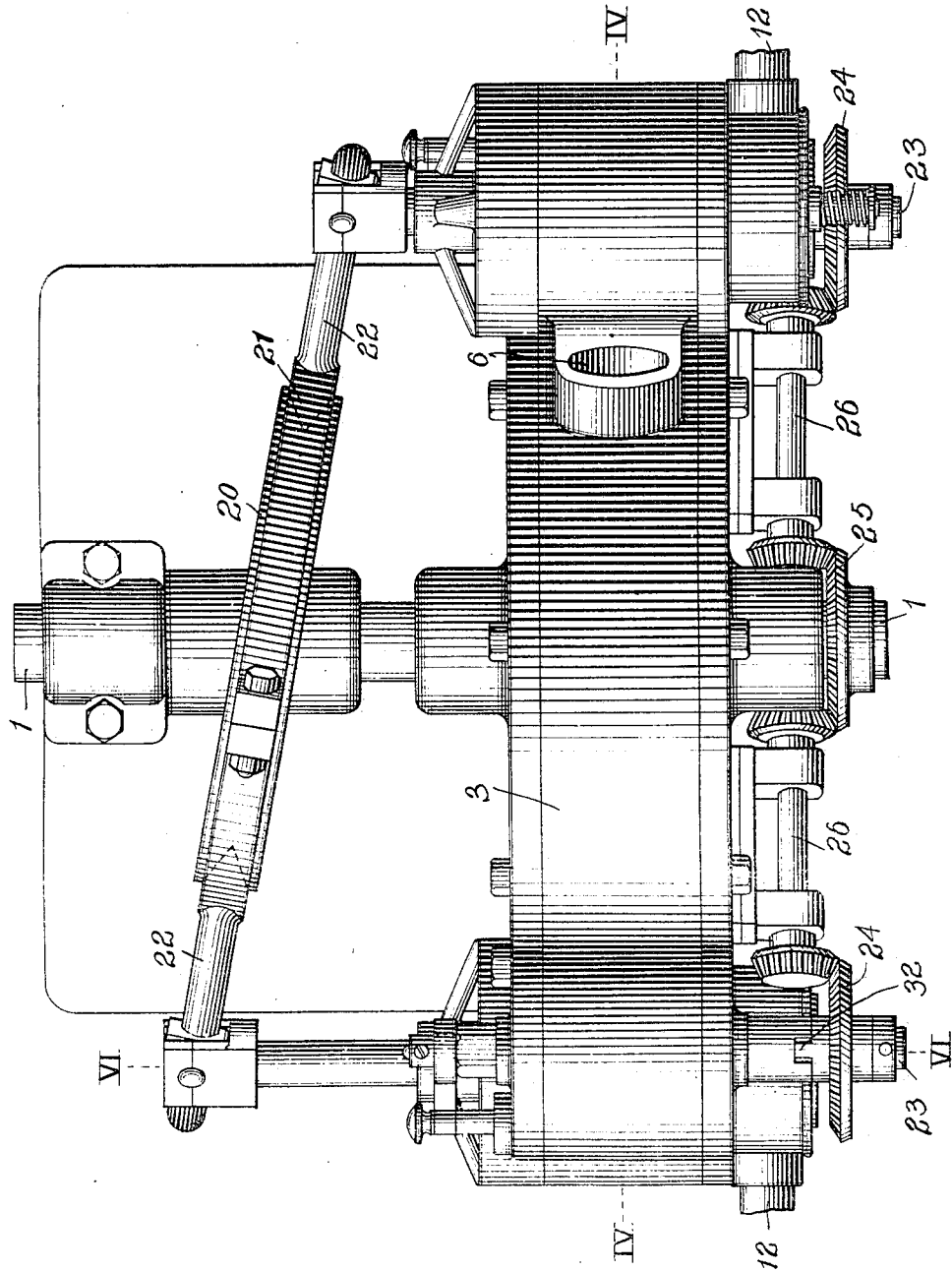
Figure 4:
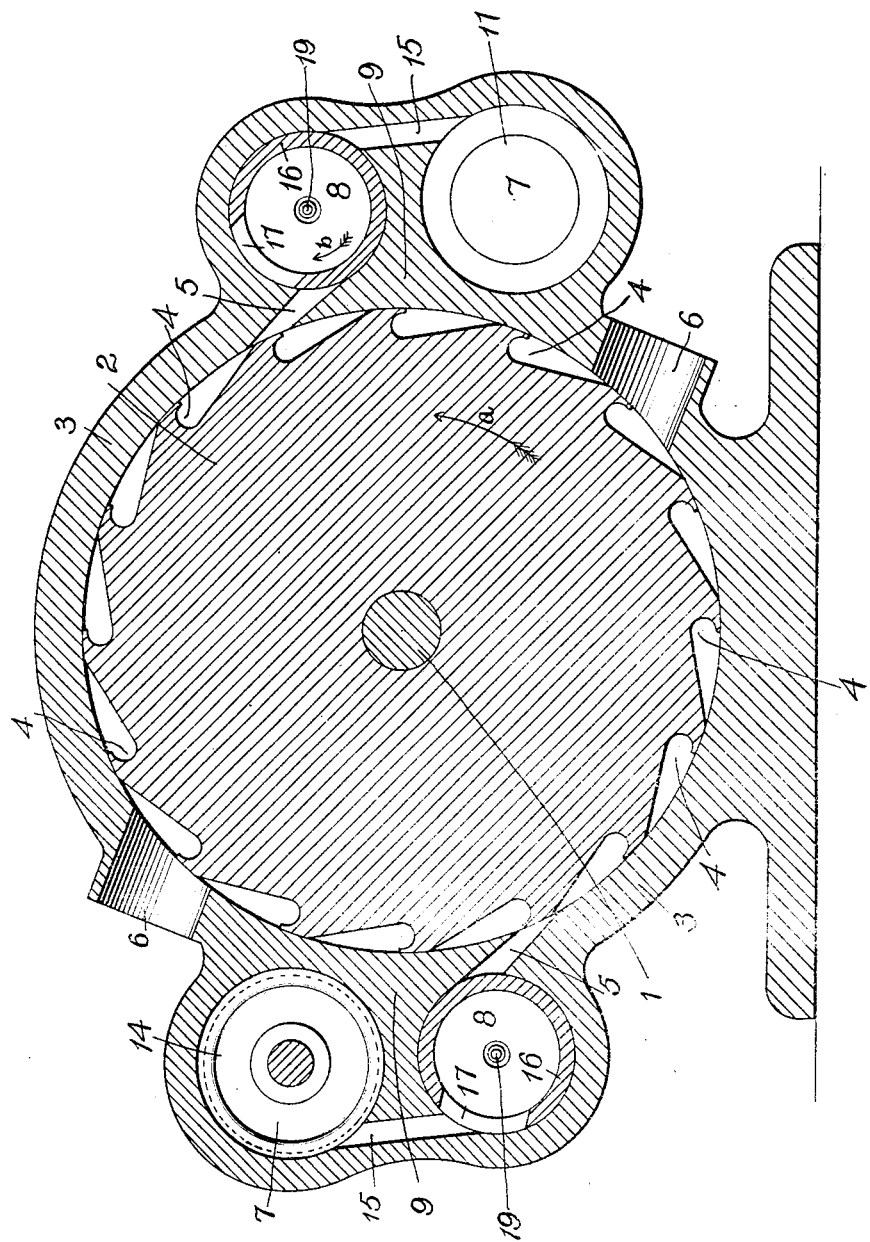

In the accompanying drawings, which form part of this specification, Figures 1 and 2 are elevations of opposite sides of a turbine-engine embodying our improvements. Fig. 3 is a plan view of it. Fig. 4 is a vertical section on the line IV IV, Fig. 3. Fig. 5 is a diagrammatic vertical section illustrating a modification whereby the turbine-engine is rendered reversible. Fig. 6 is a vertical section on the line VI VI, Figs. 1, 2, and 3. Fig. 7 is a similar section further illustrating the reversing modification. Fig. 8 is a fragmentary sectional view also illustrating the reversing modification, the plane of section being the same as in Fig. 7, but viewed in opposite direction. In Fig. 8 the valves are removed from the explosion-chamber, that the portal arrangement may be more clearly seen. Fig. 9 is a view in detail of a portion of what is shown in Fig. 4, the parts shown being in another operative position.

Referring to the drawings, the power-shaft of the turbine-engine is indicated at 1. Upon it are mounted suitable impact-surfaces which are adapted to receive the impact of the power-giving medium, and thereby to cause the power-shaft to rotate. In the specific embodiment illustrated these impact-surfaces are the anterior inner walls of a series of pockets 4, arranged upon the periphery of a cylindrical drum 2, which is concentrically mounted upon the power-shaft 1 and contained within a case or shell 3, within which the drum is adapted to rotate.

The pockets 4 are formed, preferably, as indicated in Fig. 4, the posterior walls (posterior respecting the direction of rotation, indicated by the arrow *a*) tapering gradually and, in effect, forming continuations of the induction-port, presently to be described, and the anterior walls forming abutments of concave form, which receive the impact of the entering stream of gas.

Through the case or shell are formed one or more induction-ports 5 and a corresponding number of exhaust-ports 6. The number of these ports (and of the parts which through these induction-ports deliver their exploded and expanding gas) is not essential. We have in the drawings shown two pairs of such induction and exhaust ports and two sets of coöperating parts. A single pair may be employed or three or more pairs, with preferably a corresponding number of coöperating parts. Each induction-port leads through the case or shell 3 angularly to the radius thereof and angularly to the radius of the contained cylindrical drum 1. Each exhaust-port leads through the case or shell to the place of discharge, (ordinarily the open air.) The exhaust-ports are ordinarily of greater size than the induction-ports, and the induction-ports and exhaust-ports are so spaced that no single pocket can be open to an induction-port and an exhaust-port at one time.

Compression-chambers 7 and explosion-chambers 8 are provided. In the former the gas or gases which by their explosion are to furnish the motive power are mixed (ordinarily with air) and compressed. Thence the compressed gas or gases pass into the explosion-chamber, where they are exploded, and from the explosion-chamber the expanding gaseous products of explosion pass through the induction-ports to impinge upon the walls of pockets 4, and thus to impel the power-shaft. We preferably arrange the compression-chambers and explosion-chambers in coöperating pairs and preferably employ a separate pair for each induction-port, as the drawings indicate. Our invention is not, as we regard it, limited to specific forms of compression and explosion chambers. We have, however, illustrated our preferred specific forms. The walls of these two chambers may conveniently be made in a single casting and integral with the case or shell 3, as indicated at 9. Both chambers are preferably cylindrical in form and both are conveniently arranged with axes parallel with the axis of the power-shaft. Any other desired shape or any other desired arrangement may of course be adopted.

Referring particularly to Fig. 6, which shows these two chambers in section, it will be seen that compression-chamber 7 is provided with a mixing-chamber 10, communicating with the compression-chamber proper through a port controlled by a check-valve 11. Gasolene or naphtha or other gas which by explosion is to furnish motive power is supplied to chamber 10 through a suitable conduit 12, (see Figs. 1, 2, and 3,) and air is supplied to the same chamber 10 through a port controlled by a check-valve 13. Compression-chamber 7 is further provided with means of compression, preferably a compressing-piston 14. A port 15 (see Fig. 4) leads from compression-chamber 7 to explosion-chamber 8. From explosion-chamber 8 the induction-port 5 opens. In explosion-chamber 8 is a valve 16, adapted to open in turn port 15 and port 5. This valve is conveniently cylindrical in form, adapted to fit snugly within the explosion-chamber, capable of rotation therein, and provided with an orifice 17, which registers with ports 15 and 5 in turn. Within explosion-chamber 8 may be arranged terminals 18 and 19 of an electro-dynamo circuit, between which a spark is discharged when the explosion of the gas is desired. Other means of exploding may be employed, if desired.

It will be observed that chambers 7 and 8 are cylindrical in form, that the port 5, leading from the explosion-chamber 8 and which forms the induction-port to the drum, is arranged to lead tangentially from chamber 8, and that port 15, which leads from chamber 7 to chamber 8, is arranged tangentially to both chambers. Such a shaping of parts is considered preferable.

We find it desirable to operate the compressing-piston 14 and valve 16 as well from power-shaft 1. To this end any known means of transmitting the desired motions may be employed. We shall describe our preferred construction.

Referring to Figs. 1 and 3, it will be observed that upon power-shaft 1 a disk 20 is angularly mounted. About the periphery of this disk is secured a strap 21, within which the disk is capable of rotation, and at properly-spaced intervals (proper with respect to the number and location of compression-chambers) arms 22 extend. The stems of the compressing-pistons 14 are suitably mounted upon these arms. It will be understood that as the shaft 2 rotates successive points around the extent of strap 21 travel to and fro in lines approximately parallel with the axis of the shaft, and through suitable mounting the desired stroke is given to each piston 14 at the desired time. Referring particularly to Figs. 2, 3, and 6, it will be observed that each valve 16 is mounted for rotation upon an axial stem 23, which projects beyond the valve-chamber and carries a miter-gear 24. The arrangement is such that motion is imparted to miter-gear 24 from a miter-gear 25 on power-shaft 1 through a radially-arranged shaft 26, having miter-gears at either end, which intermesh with gears 24 and 25.

The operation is as follows: The parts being in the positions indicated in Fig. 4, the compressing-piston in chamber 7 is retreating. As it recedes the explosive gas mingled with air which fills chamber 10 opens valve 11 and fills chamber 7. At the same time valve 13 opens and furnishes more air to mingle with the gas in chamber 10. Piston 14 then advances, valves 11 and 13 close, and the aerated gas is compressed. As piston 14 approaches the limit of its advance stroke the continued rotation of valve 16 brings orifice 17 to register with port 15. Thereupon chamber 8 becomes filled with the compressed aerated explosive gas. The advancing rotation of valve 16 then closes port 15 and piston 14 recedes to repeat its part. As valve 16 advances explosion is produced in chamber 8 by the discharge of an electric spark or otherwise. When, therefore, orifice 17 opens port 5, the highly expansive products of explosion rush through port 5, impinge upon the forward walls of pockets 4, and drive the drum 2 and its power-shaft 1. The continued rotation of valve 16 ultimately closes port 5 and the function of the valve is then repeated. The pockets 4, filled with the products of explosion, come in turn beneath exhaust 6, where any excess of pressure of contained gas is relieved.

As we have previously stated, any desired number of ports 5 may be employed, and, if desired, a corresponding number of explosion-chambers may be added.

In our preferred construction we provide a certain looseness in the operative connection between valve 16 and power-shaft 1, that valve 16 may have a limited movement independent of the mechanism already described as adapted to operate it. This is illustrated at 32, Fig. 3, where it appears that the stem 23 of valve 16 is provided with a notch into which extends a tooth or detent formed on the hub of gear-wheel 24; but the width of the notch is greater than the width of the detent, and thus valve 16 while being rotated by means of the movement of shaft 1 and of the interposed gearing may by proper impulse advance slightly beyond the position to which this connection with the power-shaft would normally bring it. Such an impulse is given by the gas as it escapes through the valve to the induction-port. This feature is particularly illustrated in Fig. 9. The valve 16 is normally or primarily caused to rotate in the direction indicated by the arrow $b$, and this primary or normal rotation is effected through the operative connection with the power-shaft already described. The anterior wall $n$ of orifice 17 of this valve 16 is so formed that when the orifice begins to open and to uncover induction-port 5 (a position illustrated in Fig. 9) this wall $n$ will receive the impact of gas rushing through the opening in the direction indicated by arrow $c$, and such impact will be effective to shift valve 16 forward in advance of its otherwise normal position, (such advance being provided for in the loose connection already described.) It will thus be seen that immediately upon the opening of valve 16 to the induction-port the valve is thrown to wide-open position and remains so until the continued rotation of the shaft and the movement of the interposed connection renew operative connection and carry the valve forward to closed position. (Shown in Fig. 4.)

Figs. 5, 7, and 8 illustrate a modification which provides for reversal of the power-shaft when desired. These figures will, in view of the description already given, make plain this modification. The pockets upon the peripheral surface of the drum $2^a$ do not extend throughout the length of the drum, but are formed in two separate series at either side of the middle portion, which is unbroken and serves as a partition-wall between the two series of pockets. The pockets 4 of one series are oppositely directed to the pockets $4^a$ of the other series. This is indicated in Fig. 5. Two sets of induction-ports 5 and $5^a$ are provided, ports 5 leading to pockets 4 and ports $5^a$ leading to pockets $4^a$. The valve $16^a$ within the explosion-chamber is so formed as to divide it into two chambers $8^a$ $8^a$, each provided with exploding mechanism, as indicated in Fig. 7. By the rotation of valve $16^a$ each portion $8^a$ of the explosion-chamber is brought into communication first with one arm of the branched or Y-shaped port $15^a$ and then with its proper induction-port 5 or $5^a$. Interposed between valve $16^a$ and the chamber-wall 9 is a second valve 27, which is a reversing-valve. This valve, as we preferably construct it, is cylindrical in form and is capable of a restricted rotary movement between valve $16^a$ and chamber-wall 9. It is provided with orifices 28 $28^a$, adapted (when in alternate positions) to register with one or the other of the two orifices of the Y-shaped port $15^a$, thus permitting access of compressed gas from compression-chamber 7 into one or the other of the explosion-chambers $8^a$. The drawings show also other orifices 29 $29^a$ of valve 27. These orifices register with the induction-ports 5 $5^a$ in turn, as orifices 28 $28^a$ register with one or the other of the orifices of port $15^a$. It is only sufficient, however, that the valve 27 do not obstruct ports 5 $5^a$. The essential orifices are 28 and $28^a$. When the products of explosion are delivered through ports 5, the shaft is driven in one direction. When the delivery is through ports $5^a$, the shaft is driven in the opposite direction. The position of this reversing-valve 27 is controlled by a lever 30, and when a plurality of explosion-chambers is employed the series of levers 30 may be connected by links and operated by a single reversing-lever 31, as indicated in Fig. 5.

Our invention in its broadest terms is not confined in application to the specific mechanism described, and accordingly our claims are not limited thereto.

We claim as our invention—

1. In a gas-engine the combination, with a power-shaft and impact-surfaces in operative connection therewith, of an explosion-chamber provided with an inlet-port through which gas is received and with a discharge-port through which the products of explosion are delivered to the impact-surfaces, means for exploding gas in said explosion-chamber, and a valve arranged in said explosion-chamber to move in uniform direction to open and close said inlet-port prior to explosion and to open and close said discharge-port subsequent to explosion, substantially as described.

2. In a gas-engine the combination, with a power-shaft and impact-surfaces in operative connection therewith, of a mixing-chamber wherein the gases to be exploded are mingled, a compression-chamber wherein the mingled gases are compressed, a valve-controlled port leading from said mixing-chamber to said compression-chamber, an explosion-chamber, means for exploding the mingled and compressed gases within said explosion-chamber, a port leading from said compression-chamber to said explosion-chamber, a port leading from said explosion-chamber through which the products of explosion are delivered to the impact-surfaces, and a valve in said explosion-chamber rotating in uniform direction to open and close the port from the compression-chamber prior to explosion and to open and close the port from the explosion-chamber subsequent to explosion, substantially as described.

3. In a gas-engine including in its structure a rotary power-shaft and a chamber wherein gas is compressed prior to explosion, the combination of means for compressing gas within said chamber, a disk angularly mounted on said power-shaft, and operative connection between said disk and said compressing means, substantially as described.

4. In a gas-engine the combination with a power-shaft and means for driving said shaft, of an explosion-chamber provided with a port through which the products of explosion are delivered to said driving means, a valve movable to control said port, means for normally moving said valve, said valve-moving means constructed to permit a limited independent movement thereof, and means operated on by the products of explosion for shifting said valve through a portion of its range of movement in advance of its otherwise normal position, substantially as described.

5. In a gas-engine provided with an explosion-chamber and with a port leading therefrom through which the products of explosion are delivered to the driving mechanism, the combination of a valve containing an orifice and mounted to rotate in said chamber and in rotation to open and close said port through its said orifice, means for rotating said valve, and connection between said valve and its operating means constructed to permit a limited movement of the valve independent of its operating means, the anterior edge of the orifice of said valve arranged to sustain the impact of the outflowing products of explosion on the initial opening of said port and thereby to shift the said valve independently of said operating means, substantially as described.

6. In a gas-engine in combination with a rotatable power-shaft and means for exploding compressed gases and for applying the expansive power of gases so exploded to the rotation of said shaft, of a compression-chamber, means for compressing gas within said compression-chamber, a disk angularly mounted on said power-shaft, and connection between said disk and said compressing means, substantially as described.

7. In a gas-engine, the combination of a rotatable power-shaft and coöperating impact-surfaces, an explosion-chamber, a port leading from the explosion-chamber through which the products of explosion are directed against the impact-surfaces of the power-shaft, a compression-chamber in operative connection with the explosion-chamber, a compression-piston movable within the compression-chamber, a disk angularly mounted on the power-shaft, and connection between the compression-piston and the disk whereby upon the rotation of the power-shaft the piston is caused to move within the compression-chamber, substantially as described.

8. In a turbine-engine, the combination of a rotatable power-shaft carrying peripheral impact-surfaces, an explosion-chamber, a port leading from the explosion-chamber through which the products of explosion are directed against the impact-surfaces, a compression-chamber, a port leading from the compression-chamber to the explosion-chamber, a valve controlling communication through said ports, means for compressing gas within the compression-chamber, means operated by the rotation of the power-shaft for shifting said valve to close both ports before explosion and open them successively after explosion, and mechanism operated by the rotation of the power-shaft to operate the compressing means within the compression-chamber, substantially as described.

9. In a turbine-engine, the combination of a rotatable power-shaft, two sets of oppositely-arranged impact-surfaces carried by said power-shaft, two explosion-chambers, two oppositely-directed ports leading from said explosion-chambers through which the products of explosion from each chamber are directed against one set of impact-surfaces, a reversing-valve adapted to be shifted to close either one of said ports, a valve adapted to control communication from the explosion-chambers through the orifices of the reversing-valve and through the said ports, substantially as described.

10. In a turbine-engine, the combination of a rotatable power-shaft carrying two sets of oppositely-arranged impact-surfaces, two explosion-chambers, two valve-controlled and oppositely-directed ports leading from the explosion-chambers and through which the products of explosion are directed against the impact-surfaces, a compression-chamber, communication from the compression-chamber to the explosion-chambers, and a reversing-valve controlling communication from the compression-chamber to the several explosion-chambers, substantially as described.

In testimony whereof we have hereunto set our hands.

CHARLES W. SHOEMAKER.
JOHN M. LITHGOW.

Witnesses:
F. E. GAITHER,
F. KIRCHNER.